US008866898B2

(12) United States Patent
Fuller et al.

(10) Patent No.: US 8,866,898 B2
(45) Date of Patent: Oct. 21, 2014

(54) LIVING ROOM MOVIE CREATION

(75) Inventors: Andrew Fuller, Redmond, WA (US); Rudy Poat, Clyde Hill, WA (US); Alex Aben-Athar Kipman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 13/017,750

(22) Filed: Jan. 31, 2011

(65) Prior Publication Data
US 2012/0194645 A1 Aug. 2, 2012

(51) Int. Cl.
H04N 9/47 (2006.01)
H04N 7/18 (2006.01)
G09B 9/00 (2006.01)
G06F 3/048 (2013.01)
G06T 13/40 (2011.01)

(52) U.S. Cl.
CPC ............ *G06T 13/40* (2013.01); *G06T 2200/08* (2013.01)
USPC ........................... 348/121; 348/135; 715/863

(58) Field of Classification Search
None
See application file for complete search history.

(56) References Cited

U.S. PATENT DOCUMENTS

| 6,040,841 | A | 3/2000 | Cohen et al. |
| 7,113,618 | B2 | 9/2006 | Junkins et al. |
| 7,209,181 | B2 | 4/2007 | Kriegman |
| 7,750,926 | B2 | 7/2010 | Lonsing |
| 8,206,218 | B2 | 6/2012 | Gutierrez Novelo |
| 2006/0165310 | A1 | 7/2006 | Mack |
| 2007/0270215 | A1* | 11/2007 | Miyamoto et al. .............. 463/32 |
| 2008/0012866 | A1 | 1/2008 | Forbes |
| 2008/0158242 | A1 | 7/2008 | St. Jacques |
| 2009/0085864 | A1* | 4/2009 | Kutliroff et al. .............. 345/156 |
| 2009/0215533 | A1 | 8/2009 | Zalewski et al. |
| 2009/0280897 | A1* | 11/2009 | Fitzmaurice et al. ........... 463/30 |
| 2009/0298650 | A1* | 12/2009 | Kutliroff ........................... 482/8 |
| 2010/0026809 | A1* | 2/2010 | Curry ............................ 348/157 |
| 2010/0110069 | A1 | 5/2010 | Yuan |
| 2010/0239240 | A1 | 9/2010 | Cameron et al. |

(Continued)

FOREIGN PATENT DOCUMENTS

| CN | 1226328 A | 8/1999 |
| CN | 1910619 A | 2/2007 |

OTHER PUBLICATIONS

Mazalek, Ali, Glorianna Davenport and Hiroshi Ishii. "Tangible Viewpoints: A Physical Approach to Multimedia Stories." Proceedings of ACM's Conference on Multimedia, Dec. 1-6, 2002, Juan Les Pins, France, 8 pages.

(Continued)

*Primary Examiner* — Joseph Ustaris
*Assistant Examiner* — Kevin McInnish
(74) *Attorney, Agent, or Firm* — Micah Goldsmith; Leonard Smith; Micky Minhas

(57) ABSTRACT

A system and method are disclosed living room movie creation. Movies can be directed, captured, and edited using a system that includes a depth camera. A virtual movie set can be created by using ordinary objects in the living room as virtual props. The system is able to capture motions of actors using the depth camera and to generate a movie based thereon. Therefore, there is no need for the actors to wear any special markers to detect their motion. A director may view scenes from the perspective of a "virtual camera" and record those scenes for later editing.

15 Claims, 10 Drawing Sheets

(56) References Cited

U.S. PATENT DOCUMENTS

| | | | |
|---|---|---|---|
| 2010/0245532 A1* | 9/2010 | Kurtz et al. | 348/14.03 |
| 2010/0253676 A1* | 10/2010 | Mumbauer et al. | 345/419 |
| 2010/0285877 A1 | 11/2010 | Corazza | |
| 2012/0038637 A1* | 2/2012 | Marks | 345/419 |

OTHER PUBLICATIONS

Chinese Office Action dated Jan. 6, 2014, Chinese Patent Application No. 201210020792.X, filed Dec. 19, 2011, 7 pages.

English language translation of Chinese Office Action dated Jan. 6, 2014, Chinese Patent Application No. 201210020792.X, filed Dec. 19, 2011, 8 pages.

English language translation of Abstract of foreign patent reference CN 1226328, published Aug. 18, 1999, Applicant Microsoft Corp, 2 pages.

English language translation of Abstract of foreign patent reference CN 1910619, published Feb. 7, 2007, Applicant TD Vision Corp, 2 pages.

Response to first office action for Chinese Patent Application No. 201210020792.X and Partial English Translation filed May 20, 2014, 13 pages.

* cited by examiner

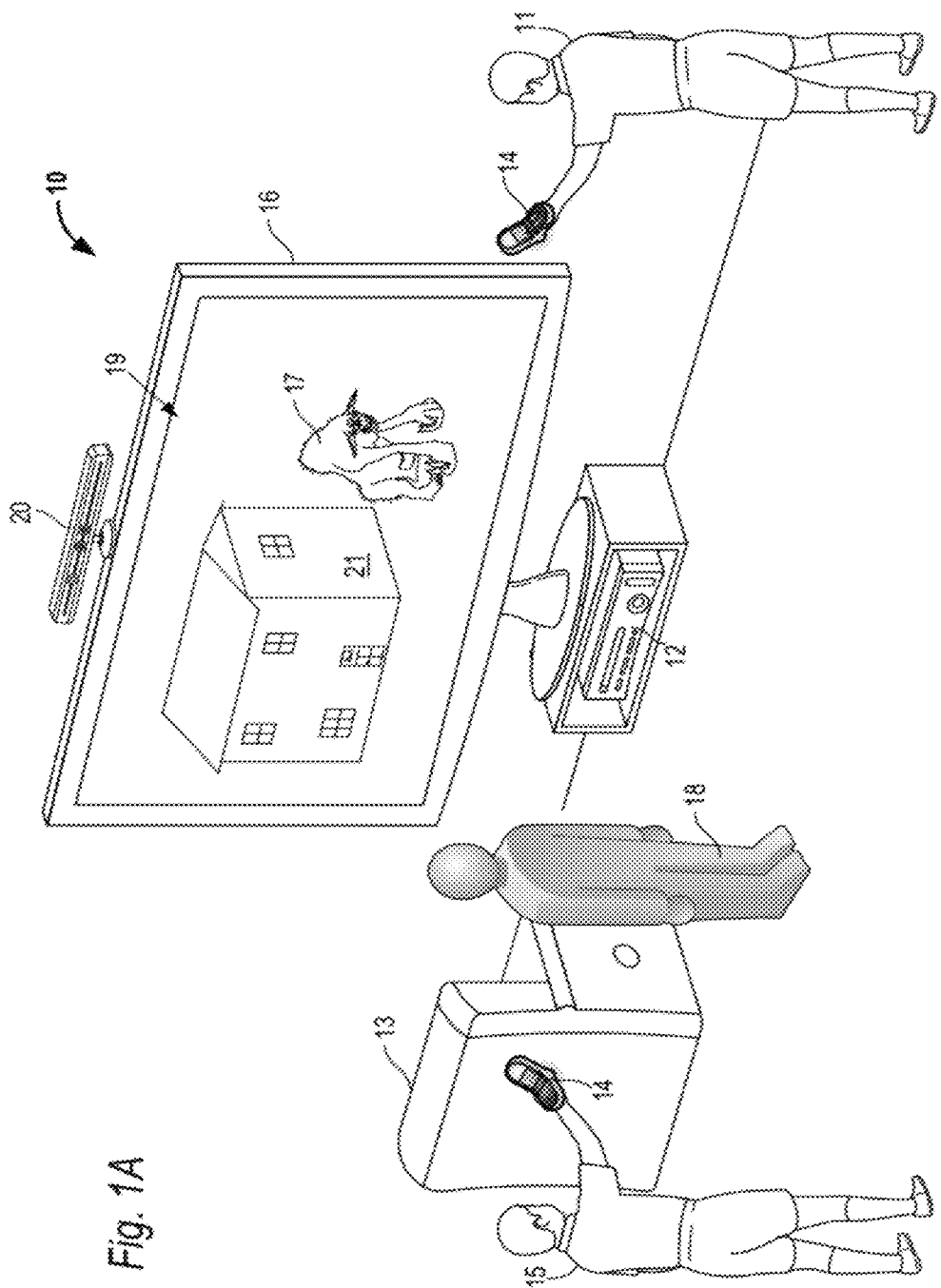

LIVING ROOM MOVIE CREATION

BACKGROUND

For some time, users have been able to use a camcorder to make home movies. Recently, electronic devices such as cellular telephones may allow users to make short movies. However, such devices have limitations in the ability to create, direct, and edit movies. Also, the ability to make animated movies of any kind can be very difficult for many people.

In the past, computing applications such as computer games and multimedia applications used controllers, remotes, keyboards, mice, or the like to allow users to manipulate game characters or other aspects of an application. Some may even allow a user to create content to a certain extent. However, the ability to create content may be hidden behind a complex set of tools. Moreover, some techniques are primarily directed at character customization and, therefore, do not allow for a richer development of content such as movies.

SUMMARY

Disclosed herein are systems and methods that provide for living room movie creation. Movies can be directed, captured, and edited using a system that includes a depth camera. The system is able to capture motions of actors using the depth camera and to generate a movie based thereon. Therefore, there is no need for the actors to wear any special markers to detect their motion. A virtual movie set can be generated based on ordinary objects in the living room serving as virtual props. Other aspects involving directing, capturing, and editing the movie are disclosed herein.

One embodiment includes a method which may be practiced in a motion capture system having a depth camera. The method includes using the depth camera to collect depth information of an environment such as a living room. A model of an actor in the environment is generated and tracked based on the depth information. A scene for a movie is generated based on the tracking of the model of the actor. The system creates a movie based on the scene in response to user commands.

One embodiment includes a system for creating movies in an environment such as a living room. The system may include a depth camera, one or more processors coupled to the depth camera, and computer storage media coupled to the one or more processors. The computer storage media have instructions stored thereon which, when executed on the one or more processors, cause the one or more processors to collect depth information of an environment using the depth camera. The processor captures motion of an actor in the environment using the depth camera, using marker-less techniques. A scene is generated by the processor based on the captured motion of the actor. The processor determines one or more positions of an electronic device in the environment to be used as a virtual viewfinder. These positions may be for a period of time associated with the scene. The processor generates a version of the scene from the perspective of the electronic device at the one or more positions, and provides the version of the scene to the electronic device.

One embodiment includes a method including the following. Depth information of an environment is collected using a depth camera, and a model of the environment is generated based on the depth information. A virtual movie set is generated based on the depth information. A skeletal model for an actor in the environment is developed using the depth information. The skeletal model is tracked for a period of time. A scene is generated based on the virtual movie set and the tracking of the skeletal model. One or more positions of an electronic device to be used as a virtual viewfinder are determined for the period of time that the skeletal model is tracked. A version of the scene is generated from the perspective of the electronic device at each of the one or more positions and provided to the electronic device. A request is received from the electronic device to record the scene. Metadata is stored that describes the tracking of the skeletal model and the one or more positions for the electronic device for the period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A illustrates an example embodiment of a target recognition, analysis, and tracking system for providing living room movie creation.

DETAILED DESCRIPTION

Figure 1B:
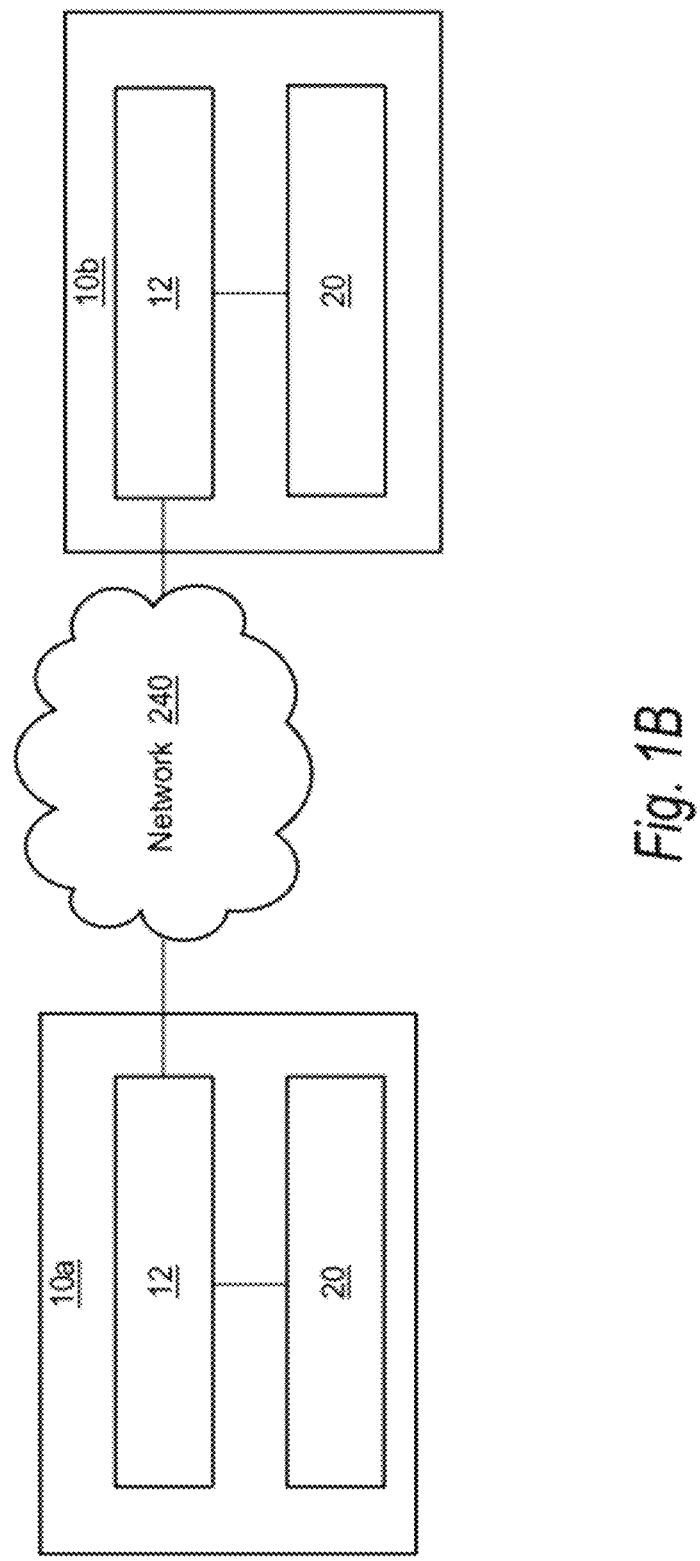
FIG. 1B illustrates an example embodiment of a target recognition, analysis, and tracking system for providing networked living room movie creation.

Disclosed herein are systems and methods that provide for living room movie creation. Movies can be directed, captured, and edited using a system that includes a depth camera. A movie set can be created by using ordinary objects in the living room as virtual props. For example, a couch in the living room could be represented as a rock in a virtual set on a display screen. A movie director can move the objects around the living room to create and modify a virtual set in which a scene will be shot. The system may generate a 3D model of the room and determine what images should be rendered for the virtual props. A virtual set can also be created without the use of objects in the living room. For example, a virtual set of a beach or a space ship can be shown on a display screen. The director can modify this virtual set by, for example, "grabbing" a palm tree and moving it. The system is able to capture motions of actors using the depth camera and to generate a movie based thereon. Therefore, there is no need for the actors to wear any special markers to detect their motion. In order to allow greater freedom in movie making, the actions of a human actor might be re-targeted as a non-human. For example, a human actor could be represented as an animal in the movie. The director can position an electronic device that serves as a "virtual camera" in a vantage point from which a scene is to be captured. The system can detect the location of the virtual camera and determine how to generate the scene from that vantage point. Note that the virtual camera need not be used to record the scene. Rather, depth and/or RGB data from the depth camera can be used as the subject matter for the movie. Note that there may be multiple virtual cameras, such that the director might view and capture a scene from multiple perspectives. The system may also be used to edit the movie. As one example, the depth camera might be used to allow the user to enter commands to edit the movie.

FIG. 1A shows a system 10 for creation of movies in an environment such as a living room. The system 10 may be referred to as a target recognition, analysis, and tracking system 10 which may be used to recognize, analyze, and/or track a human target such as the user 18. In general, the system 10 includes a computing environment 12, depth camera system 20, and a display 16. The depth camera system 20 may include a camera for determining depth information, as well as an RGB camera. Note that the RGB camera could be a separate component from the depth camera system 20. The depth camera system 20 may be used to collect the data upon which the movie will be based.

In this example, the user 18 is an actor in the movie being created. Thus, user 18 may also be referred to herein as an actor. The system 10 is able to capture the user's movements using the depth camera 20 and to generate a movie based thereon. Thus, the movie can be generated based on depth information. Note other data such as video data from an RGB camera could also be used to generate the movie. The display 16 depicts a scene 19 based, at least in part, on information captured by the depth camera system 20. Note that the term "scene" may refer to actions that take place over some period of time. For example, a "scene" in a movie may refer to actions that take place over a period of time. A scene 19 may have multiple frames of data that are presented sequentially.

In this example, the actor 18 is being re-targeted in the scene 19 as a monster 17. The system 10 may present the monster 17 in a way that mimics actions of the actor 18. By "re-targeting" the actor it is meant that the scene 19 includes some element that is based on the actor 18, but is modified or enhanced in some way. In some embodiments that re-target, the system 10 develops a skeletal model of the actor 18 based on depth information and then maps the skeletal model to some non-human skeletal model. Then, features such as fur, eyes, clothes etc. may be overlaid on the non-human skeletal model.

The room may also have various objects that may be used as virtual props. In this example, a chair 13 in the environment is being presented as a house 21 in the scene 19. It may be stated that the system 10 allows for the creation of a "virtual movie set" by allowing various real-world objects to be used as different kinds of props.

Thus, at least some of the elements in the scene 19 may be computer generated graphics. However, as noted the scene 19 could be based on video data also. For example, instead of re-targeting the actor 18, actual video data from an RGB camera might be used to represent the actor 18 in the scene 19. Other objects may also be represented in the scene 19 by video data.

A director 11 and a camera person 15 are also depicted, each of which is holding an electronic device 14, which may serve as a virtual camera. By virtual camera it is meant that the device 14 might not actually capture video, but may be used to show the user how the scene 19 would appear from the vantage point of the electronic device 14. The system 10 may determine the location and orientation of the electronic device 14 being held by the director 11, such that is able to determine how the scene 19 would appear from that perspective. The system 10 may then transmit a signal to the director's electronic device 14 such that the director 11 can view how the scene 19 will appear from the director's perspective. In this example, the director 11 may see the monster 17 in front of the house 21. Note that the director 11 may view the scene is real-time. Therefore, if the actor 18 is moving his/her arms, the director 11 may see the monster 17 moving its "arms." Note that the director 11 can move around the room to test out how different camera perspectives will appear. Likewise, the system 10 can perform similar functions for the camera person's 15 electronic device 14.

The electronic device 14 could be any electronic device 14, such as a cellular telephone, a notepad computer, etc. Typically, the electronic device 14 has some type of display screen for viewing the scene 19. Note that the electronic device 14 itself does not need to capture any video or the like, although that is one possibility. Rather, the data upon which the scene 19 is generated may be collected from the depth camera system 20. The electronic device 14 may have one or more sensors to determine position and orientation of the device 14 in the room.

In one embodiment, the director 11 or camera person 15 can use the electronic device to capture the scene 19. In other words, the director 11 could decide to record the scene 19 from selected camera perspectives. As one example, the director 11 enters input on the electronic device 14 to cause the system 10 to record metadata that describes the actor's movements, as well as the locations and orientations of the electronic devices 14. Later, this metadata can be used to edit the movie based on one or more recorded scenes 19.

Further details of one embodiment of the system 10 will now be discussed. Hardware for implementing the present technology includes target recognition, analysis, and tracking system 10 which may be used to recognize, analyze, and/or track a human target such as the user 18. Embodiments of the target recognition, analysis, and tracking system 10 include a computing environment 12 for executing a gaming or other application, such as movie creating and editing. The computing environment 12 may include hardware components and/or software components such that computing environment 12 may be used to execute gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users, which information is received by the computing environment and used to create or edit movies. Examples of the computing environment 12 and capture device 20 are explained in greater detail below.

Embodiments of the target recognition, analysis and tracking system 10 may be connected to an audio/visual device 16 having a display. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

Suitable examples of a system 10 and components thereof are found in the following co-pending patent applications, all of which are hereby specifically incorporated by reference: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

The example of FIG. 1A shows a system that is contained in a single environment, such as a living room. However, in some cases different actors 18 might be at different physical locations. In one embodiment, the target recognition, analysis, and tracking system 10 is networked to a remote target recognition, analysis, and tracking system 10 to allow actors 18 to be at different locations. FIG. 1B shows a system for creation of movies using networked filming environments. Two target recognition, analysis, and tracking systems 10a, 10b are connected by a network 240 in this example. The network 240 could be a wide area network (WAN) such as the Internet. The network 240 could be (or include) a local area network (LAN) such as the IEEE 1394 or Bluetooth. Network 240 may in fact be composed of one or more networks.

Therefore, one system 10a could monitor an actor 18 and collect motion data and/or depth information, which may be transmitted over the network 240 to other system 10b. System 10a might also collect and transfer RGB data. System 10b could also monitor an actor 18 and collect motion data, as well as RGB data. System 10b may use motion data (and possibly RGB data) from any of the sources to generate a movie, based on editing commands from a user. This could allow separate scenes of the movie to be shot in separate locations. However, it could also allow the same scene to be shot in separate locations, with data collected at two or more locations being merged to form a single scene. The merging of the data could be performed by the system 10 in response to editing commands from the user.

Figure 2:
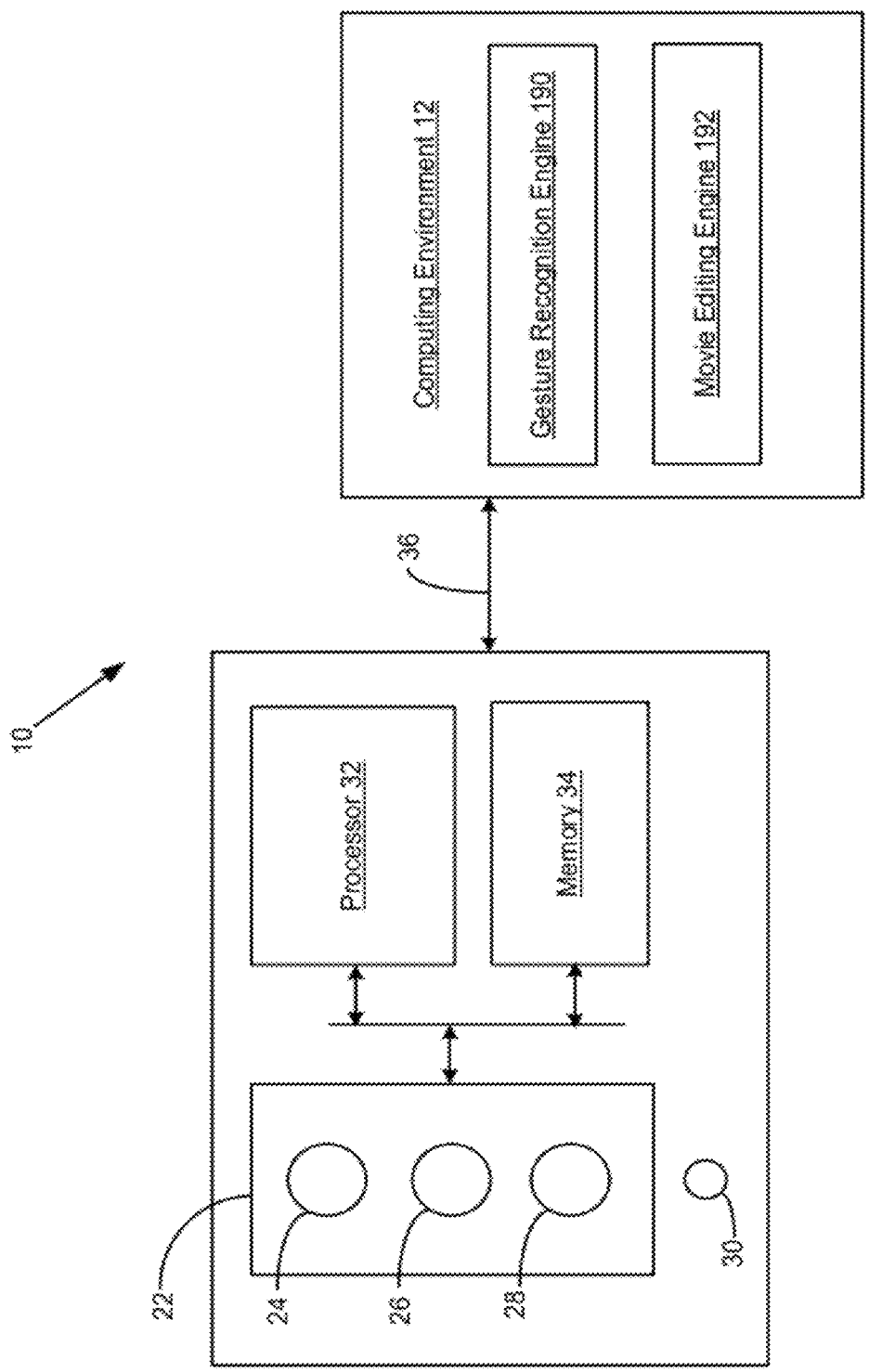
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include one or more microphones 30. The microphone(s) 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22. In one embodiment, rather than having a processor 32, the capture device 20 has an application specific integrated circuit (ASIC) for processing information from the light sensors.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. In some embodiments, re-targeting is performed, such that the actor 18 is rendered in a way other than their actual appearance. In some embodiments, the system 10 determines controls to perform in an application executing on the computer environment based on, for example, gestures of the user that have been recognized from the skeletal model. For example, as shown, in FIG. 2, the computing environment 12 may include a gesture recognition engine 190 for determining when the user has performed a predefined gesture. Also shown is a movie editing engine 192, which allows users to enter commands through natural input (e.g., voice commands and/or gestures).

Figure 3A:
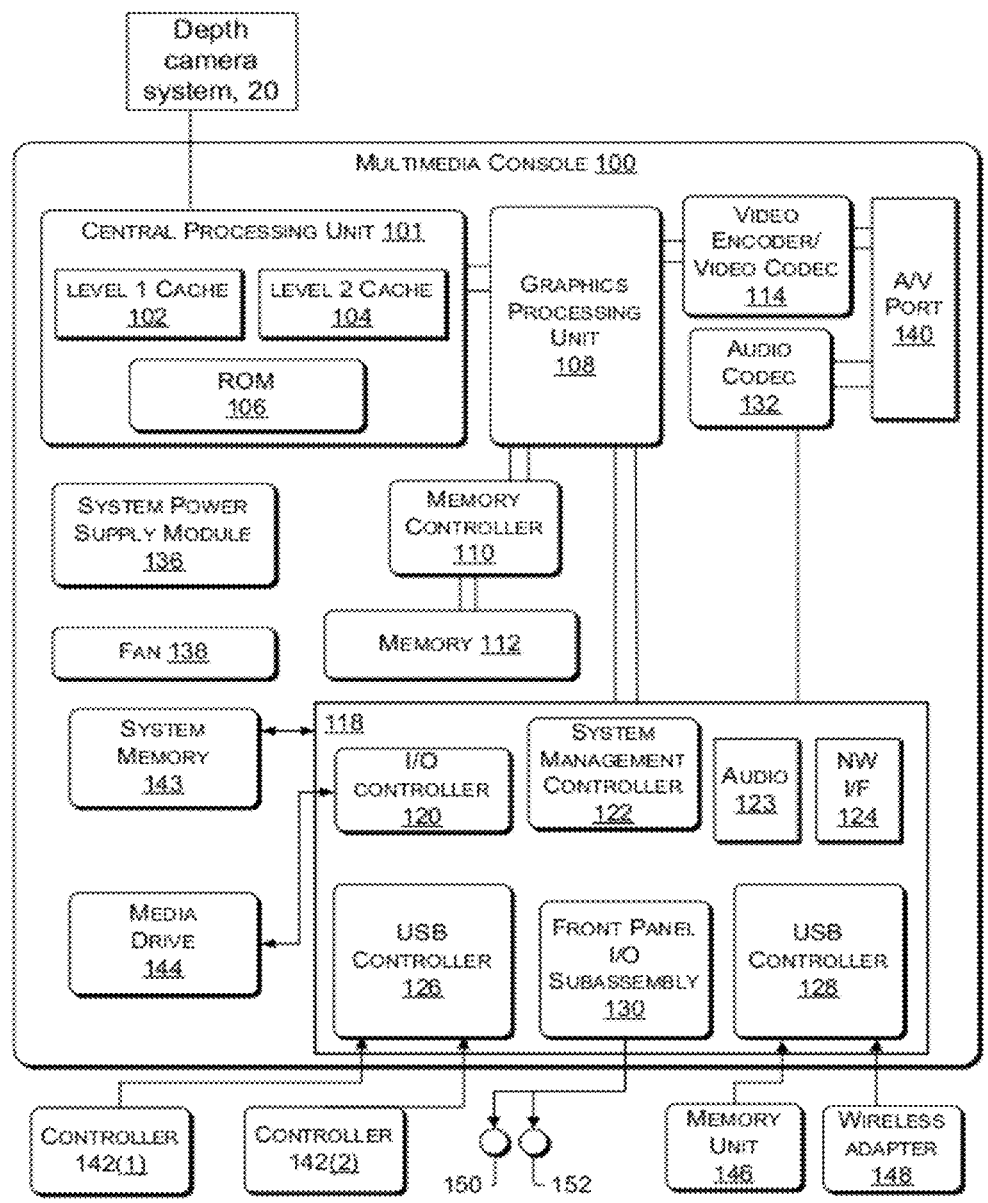
FIG. 3A illustrates an example embodiment of a computing environment that may be used to interpret one or more gestures in a target recognition, analysis, and tracking system.

FIG. 3A illustrates an example embodiment of a computing environment that may be used for creating and editing movies, as well as other purposes. The computing environment may be used for computing environment 12 of FIG. 1A, 1B or 2. The computing environment of FIG. 3A is a multimedia console 100, which may be used for gaming applications. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for optional peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
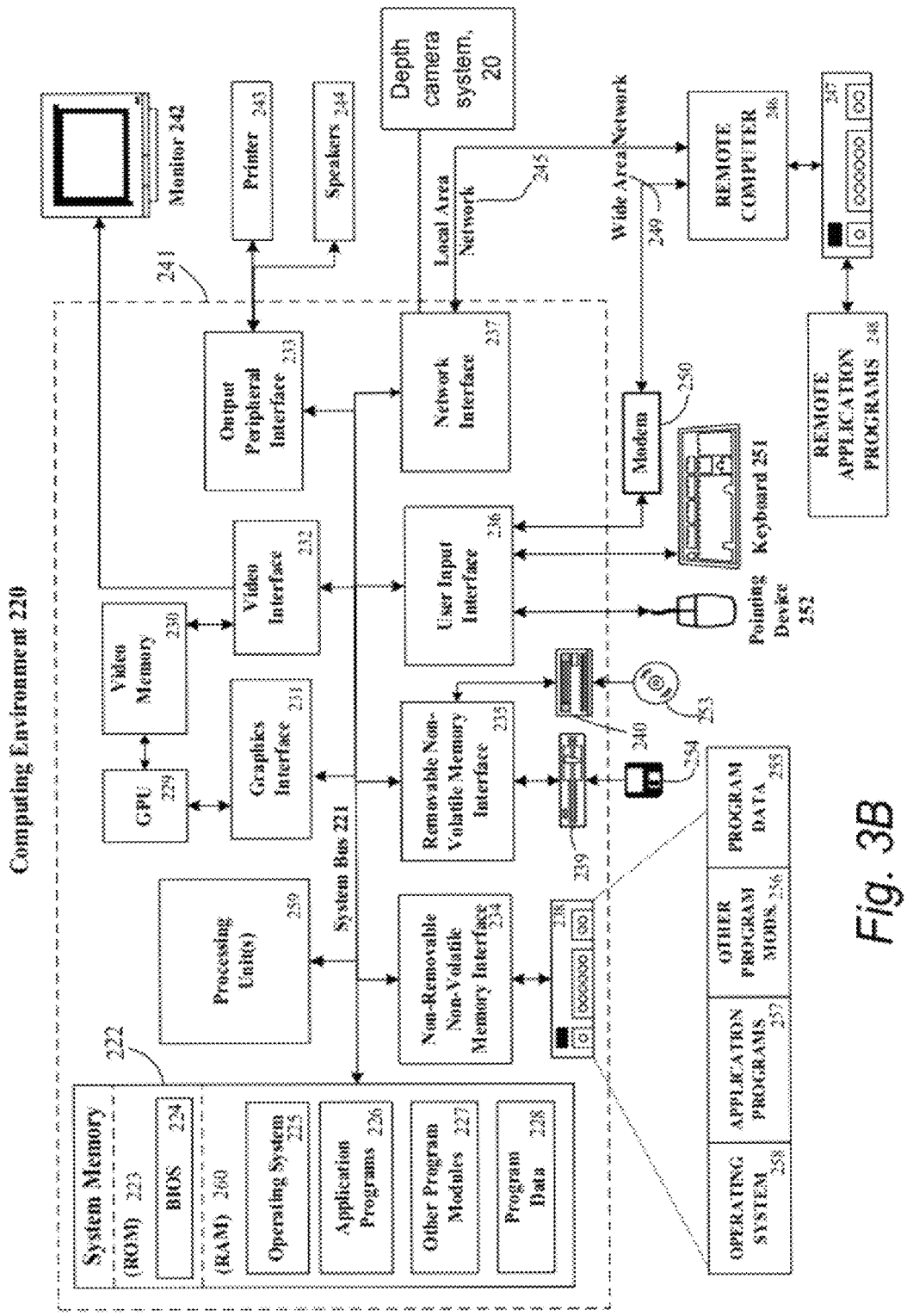
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit.

In FIG. 3B, the computing environment 220 comprises a computer 241, which typically includes a variety of computer readable media. The computer 241 may be connected to a depth camera system 20 to receive, for example, skeletal data and other metadata from which a movie may be created and edited.

Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228. One example of application program 226 is a story application 226 used for presenting an interactive story experience to a user as explained herein. FIG. 3B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
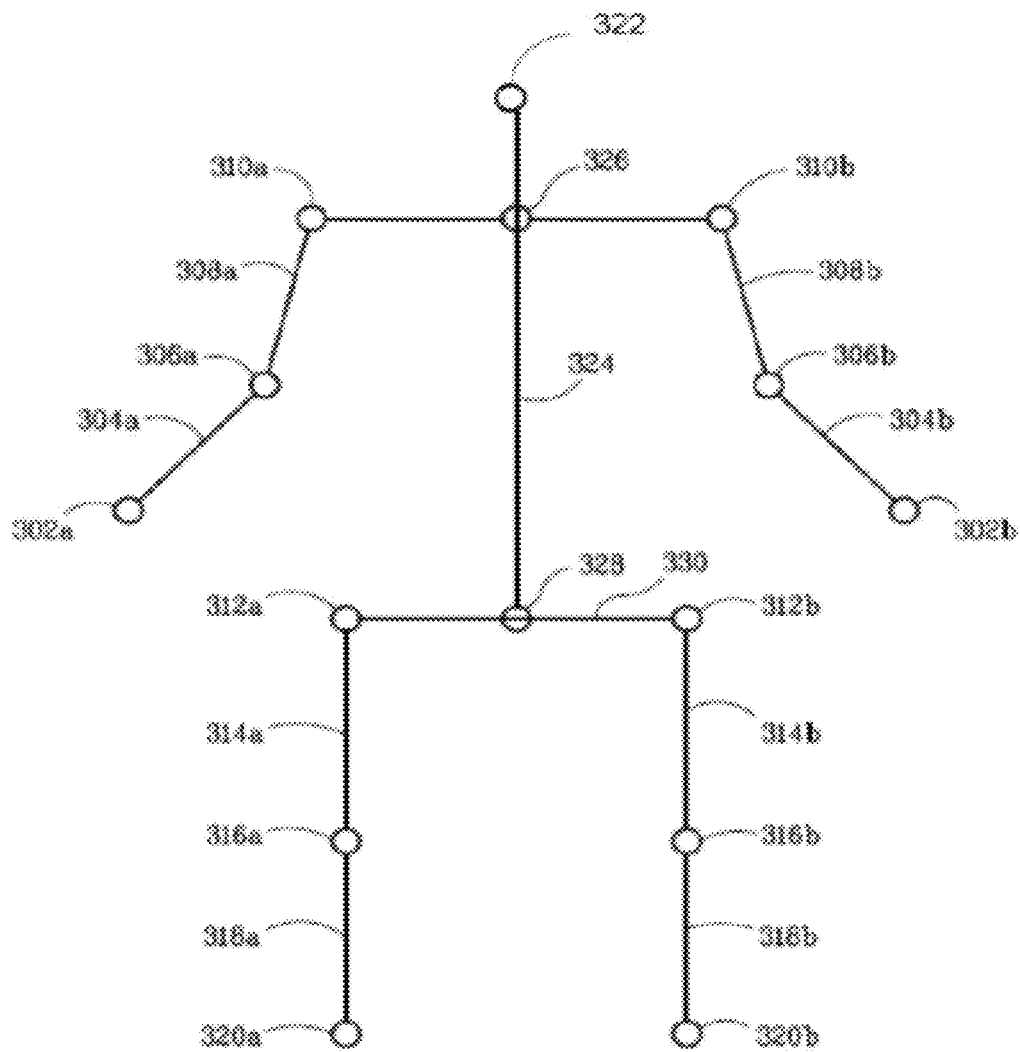
FIG. 4 illustrates a skeletal mapping of a user that has been generated from the target recognition, analysis, and tracking system of FIGS. 1A-2.

FIG. 4 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

Figure 5:
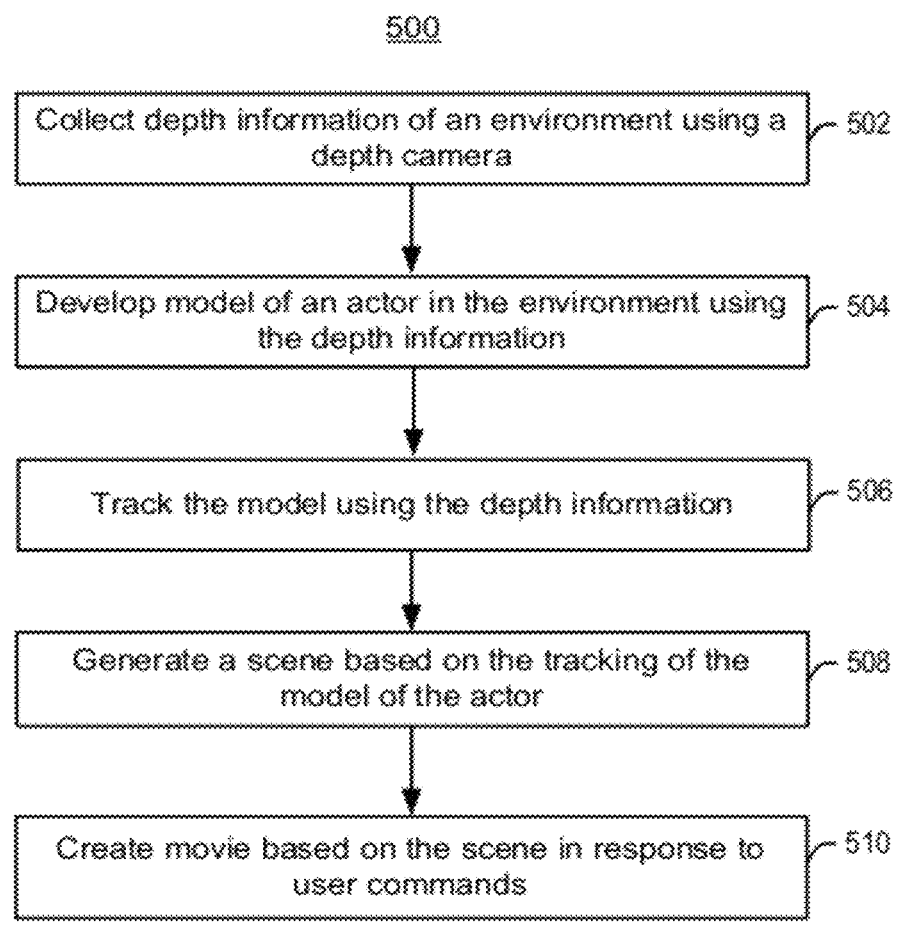
FIG. 5 is a high level flowchart of the operation of an embodiment of the present technology for providing living room movie creation.

FIG. 5 is a high level flowchart of the operation of an embodiment of a process 500 of providing for movie creation. The process 500 may be performed by system 10 or another system. For purposes of illustration, reference will be made to the example system 10 of FIGS. 1A, 1B, and 2, but process 500 is not limited to that example. In step 502, depth information of an environment is collected using a depth camera. For example, depth camera system 20 is used to collect depth information. Since process 500 may be used for the creation of movies, this information may be collected over time. For the sake of discussion, in step 502 the data collection takes place over some "period of time." Note that steps 504-508 may take place over this same period of time. In one embodiment, system 10 maintains a 3D model of the room based on the depth information. In some embodiments, step 502 includes collecting RGB data. For example, the RGB camera 28 may be used to collect video data, which might be used in the movie. As one example, the video data could be an MPEG stream.

The depth information may be down-sampled to a lower processing resolution so that it can be more easily used and processed with less computing overhead. Additionally, one or more high-variance and/or noisy depth values may be removed and/or smoothed from the depth information; portions of missing and/or removed depth information may be filled in and/or reconstructed; and/or any other suitable processing may be performed on the received depth information may such that the depth information may used to generate a model such as a skeletal model.

In step 504, a model of an actor 18 in the environment is developed based on the depth information. In one embodiment, the model is a skeletal model. Note that the model can be developed without requiring the actor to wear any special markers. This model may be stored for later use.

In step 506, the model of the actor is tracked using the depth information. Note that the tracking may take place of the "period of time" that was referred to in step 502. Further details of tracking a model of an actor are discussed below.

In step 508, a scene is generated at least based on the tracking of the model of the actor. Note that the "scene" may include multiple frames of data. For example, the scene might include 30 frames of data per second. The scene can be based on information other than the tracking of the skeletal model. In some embodiments, objects in the room are used as virtual props for the scene. For example, referring to FIG. 1A, the chair 13 is presented as the house 21 and the actor 18 is presented as the monster 17. In this example, the chair 13 is used as a virtual prop. Further details of working with virtual props are discussed below. In this example, the actor 18 is re-targeted. Further details of re-targeting an actor 18 are discussed below. Note that retargeting the actor 18 is not required. Video data from the RGB camera 28 might be used in the scene. Thus, the scene may be generated from computer generated graphics, video data, or a combination thereof.

In step 510, the system 10 creates a movie based at least on the scene in response to user commands. Creation of the movie may involve allowing a user to direct, capture, and edit the movie. In some embodiments, a version of the scene is provided to an electronic device being held by a director 11 or other person. The version may be from the perspective of the electronic device 14. Thus, the electronic device 14 may serve as a "virtual viewfinder." In some embodiments, step 510 includes capturing a scene in response to a request from the electronic device 14. For example, the director 11 could make a selection on the electronic device 14 that causes the electronic device 14 to instruct the system 10 that a scene should be recorded. In some embodiments, step 508 includes allowing a user to edit a movie using the system 10. Further details of allowing a user to direct, capture, and edit the movie are discussed below.

Figure 6:
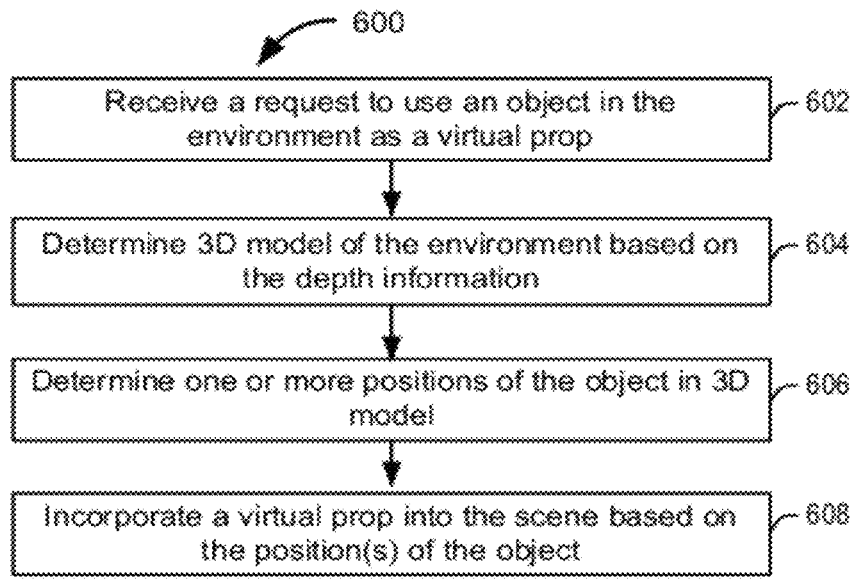
FIG. 6 is a flowchart of one embodiment of a process of incorporating a virtual prop into the movie.

FIG. 6 is a flowchart of one embodiment of a process 600 of incorporating a virtual prop into the movie. In general, process 600 allows the director 11 to use certain objects as props in the movie. Process 600 is one technique that may be used when generating a scene. Thus, process 600 provides more details for one embodiment of step 508 of process 500. In step 602, the system 10 receives a request from the director 11 or other user to use an object in the environment as a prop. In one embodiment, this includes the system 10 taking a "still shot" of the room and displaying the still shot on the display 16. Thus, initially the user may see objects such as the chair 13 on the display 16. If desired, the user may have the system "re-target" the chair 13 such that it is represented as some other object. The system 10 might have a library of possible objects for the user to select from. After the user selects a "virtual object," the system 10 may then display that virtual object on the display for the user to see. The user may then be able to modify the virtual prop by, for example, changing properties such as size, color, shape, etc. The system 10 then stores this information while linking the object in the real world to it, such that if the user moves the real-world object that the system 10 may track the position of the object. Note that step 602 may take place prior to process 500, during an initial setup.

After the initial setup phase of step 602, some time may pass. In step 604, while "filming" a scene, the system 10 determines a 3D model of the environment based on the depth information collected from the depth camera in process 500. In step 606, the system 10 determines the position (or positions) of the real-world object in the 3D model. Since the object may move during filming, the system 10 may track the object.

In step 608, the system incorporates a virtual prop into the movie based on the position of the real-world object. Referring to the example of FIG. 1, the system 10 may incorporate a house 21 into the scene 19 on the display 16.

Figure 7:
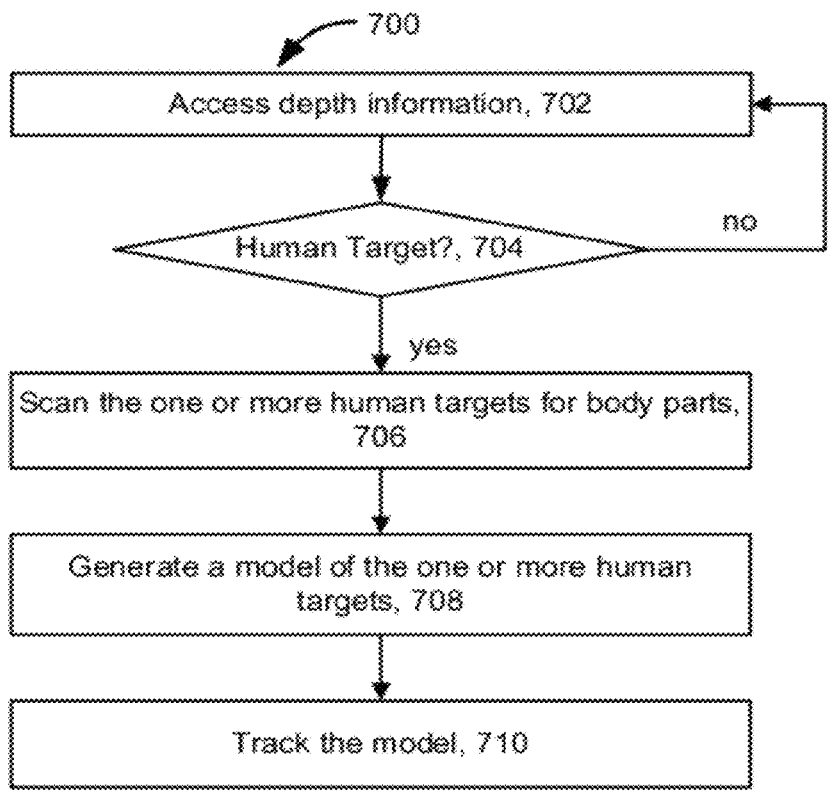
FIG. 7 depicts a flow diagram of a process of developing a model for an actor.

In one embodiment, a virtual set is created, at least in part, without the use of objects in the living room. For example, the user might wish to create a movie that has a beach setting. The system 10 could create a set of a beach without reliance on any objects in the living room. The system 10 may display this set on any of the display screens (e.g., display 16, display on electronic device display 14, etc.). In one embodiment, this is a computer generated scene. The director 11 may modify the virtual set by, for example, "grabbing" a virtual prop and moving it. For example, the director 11 might point to a palm tree on the display 16. The system 10 may use the depth camera to determine what the director is pointing at. The virtual prop may be highlighted on the display, but that is not required. The director 11 may then make the grabbing motion and move the virtual prop. Again, the system may use the depth camera to track the director's movements to determine where to move the virtual prop. FIG. 7 depicts a flow diagram of a process 700 of developing and tracking a model for an actor 18. Process 700 is one embodiment of steps 504-506 of process 500. The example method may be implemented using, for example, the depth camera system 20. The actor 18 may be scanned to generate a model such as a skeletal model, a mesh human model, or any other suitable representation of a person. At step 702, depth information (e.g., a depth image) is accessed. This may be the depth information from step 502 or process 500. A depth image may be a matrix of depth values. Each element of the matrix may represent a region of the environment. A depth value may define the distance from the depth camera 20 to an object in that region. An element in the matrix may be referred to as a pixel.

At decision step 704, a determination is made as to whether the depth image includes a human target. This can include flood filling a target or object in the depth image comparing the target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 704 is true, step 706 is performed. If decision step 704 is false, additional depth information is accessed at step 702.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 706 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target.

Step 708 includes generating a model of the human target. In one embodiment, measurement values determined by the scanned bitmask may be used to define one or more joints in a skeletal model. The one or more joints are used to define one or more bones that correspond to a body part of a human. Generally, each body part may be characterized as a mathematical vector defining joints and bones of the skeletal model. Body parts can move relative to one another at the joints. The model may include information that describes the rotation of the user's head such that the orientation of the user's ears is known.

At step 710, the model is tracked by updating the person's location several times per second. As the user moves in the physical space, information from the depth camera system is used to adjust the skeletal model such that the skeletal model represents a person. Optionally, the user 18 might wear inertial sensors; however, inertial sensors are not required. If used, data from the inertial sensors may also be used to track the user. In particular, one or more forces may be applied to one or more force-receiving aspects of the skeletal model to adjust the skeletal model into a pose that more closely corresponds to the pose of the human target in physical space. Generally, any known technique for tracking movements of one or more persons can be used.

Note that process 700 may be used more than once to generate a single scene. In this way a scene may be constructed based on multiple passes in which an actor 18 plays a different role with each pass. For example, process 700 could be used to track an actor 18 over non-overlapping time periods. The system 10 may merge the tracked models of the actor 18 into a scene in which the actor's motions overlap in time in the scene. As one example, a different skeletal model may be tracked for each of the distinct time periods. Each skeletal model may correspond to a different role.

Figure 8:
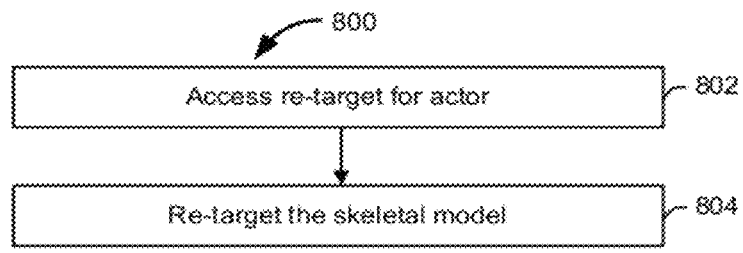
FIG. 8 is a flowchart of one embodiment of a process of re-targeting a model of an actor.

FIG. 8 is a flowchart of one embodiment of a process 800 of re-targeting a model of an actor 18. Process 800 may be used when generating a scene based on a model of an actor 18. Thus, process 800 is one embodiment of step 508 of process 500. In one embodiment, process 800 creates a non-human image that tracks behavior of the actor 18. Note that prior to process 800, a user may have informed the system 10 as to how the actor 18 should be re-targeted. For example, the user entered commands (possibly with gestures or voice) to instruct the system 10 that the actor 18 should be re-targeted as a tiger. Also, prior to process 800, a model of the actor 18 may have been developed. For example, process 700 may have been performed to develop a skeletal model.

In step 802, a re-target object is accessed. For example, the system 10 accesses stored information based on the user's previous request that the actor 18 is to be re-targeted a tiger or a monster.

In step 804, re-targeting is performed. In one embodiment, the system 10 maps the skeletal model to that of the re-target. For example, a monster may have very long arms relative to the actor 18. Therefore, the length of the arm bones may be modified in step 804. In some cases, joint angles may be modified. For example, the monster's head could be lowered and angled downward relative to the actual position of the actor's head. After re-mapping, various textures may be overlaid onto the re-mapped skeletal model. Overlaying textures may include adding features such as hair, clothes, skin, etc. These elements may or may not correlate to features of the actor 18. For example, the clothing worn by the monster might not have any correlation to the clothing worn by the actor 18.

Figure 9:
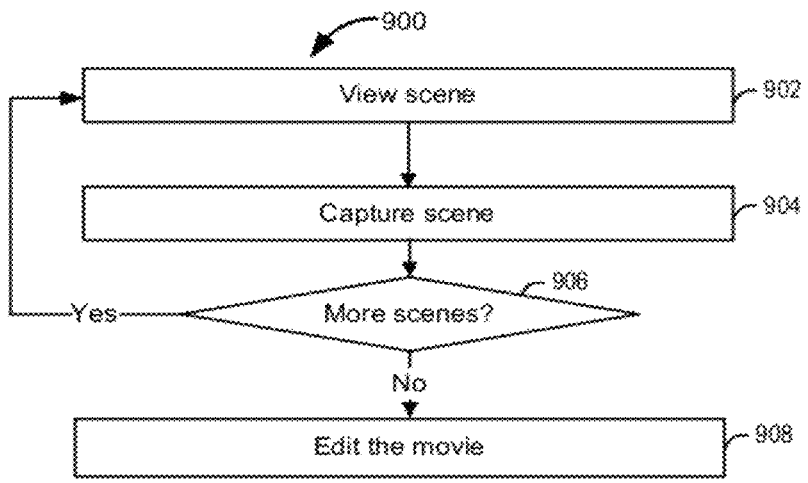
FIG. 9 is a flowchart of one embodiment of a process of creating a movie.

FIG. 9 is a flowchart of one embodiment of a process 900 of creating a movie based on the scene in response to user commands. Process 900 is one embodiment of step 510 of process 500. Process 900 describes high level details of creating a movie based on the scene. As noted above, a scene 19 may refer to actions that occur over some period of time and may include multiple frames of data that are presented sequentially.

In step 902, a scene 19 is presented on the electronic device 14 such that the director 11 may view the scene 19. Note that the scene 19 may be presented from the perspective of the director 11. Also, the director 11 may view the scene 19 in real-time. For example, referring to FIG. 1A, the director 11 sees the scene 19 from the perspective of the electronic 14 device. In a sense, the electronic device 14 is being used as a virtual viewfinder to allow the director 11, camera person 15, etc. to determine a suitable camera angle.

In step 904, a scene 19 is captured by the system 10 in response to a request from the electronic device 14. Step 904 allows the director 11 (or other person) to capture a scene 19 once it is determined that a suitable camera angle has been found. In one embodiment, metadata that describes the scene (e.g., skeletal data) as well as the camera position(s) is captured in step 904. Further details are discussed below.

The director 11 may capture as many scenes 19 as desired, as indicated by decision step 906. In step 908, the movie is edited using the system 10. Editing allows the user to create a movie based on all of the captured scenes. As noted, in some embodiments, the user enters editing commands using voice commands and/or gestures, which are recognized by system 10.

Figure 10:
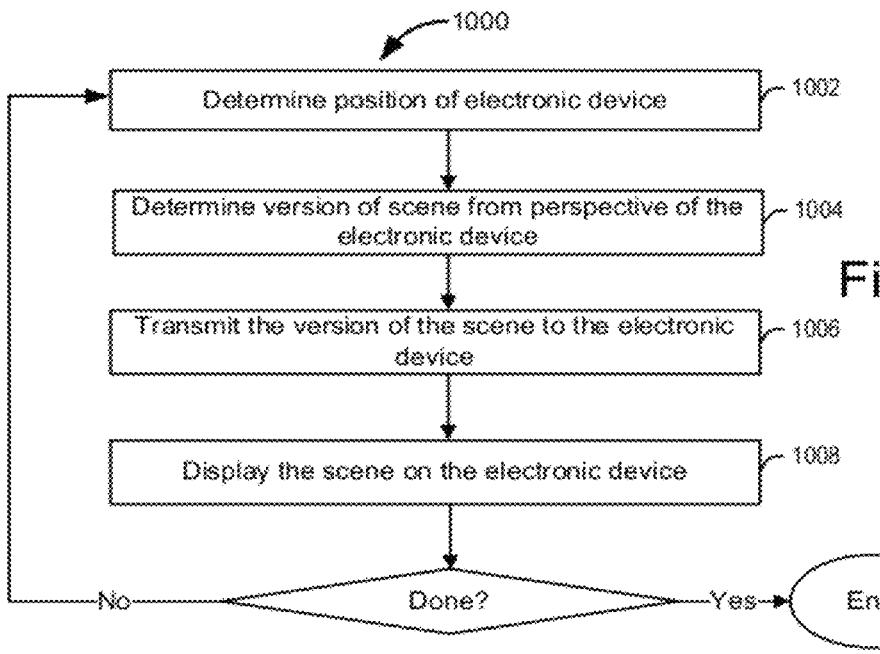
FIG. 10 is a flowchart of one embodiment of a process of viewing a scene at an electronic device.

FIG. 10 is a flowchart of one embodiment of a process 1000 of viewing a scene 19 at an electronic device 14. Process 1000 is one embodiment of step 902 of process 900. In step 1002, a position of an electronic device 14 in the environment is determined For example, the system 10 determines the position of the director's electronic device 14. Note that the position may include the location in 3D space, as well as the orientation.

Numerous techniques may be used to determine the position of the electronic device 14. Moreover, the position may be determined based on various types of data. One example is to have the depth camera system 20 identify the 3D coordinate of the electronic device 14. One technique for doing this is to track the position of the director's hand, based on skeletal data. In this case, the director 11 might inform the system 10 that the electronic device 14 is in the director's right hand, for example. As one alternative, the system 10 might be able to recognize the electronic device 14 based on pattern recognition. In this case, the director 11 might inform the system 10 that there is a certain type of electronic device 14 being used. The system 10 might instruct the director 11 to hold the electronic device 14 at a certain location such that the system 10 may learn to recognize the electronic device 14. The system 10 could convey the location to the director 11 by displaying the living room on the display 16 and highlighted a target region. Still another way to locate the electronic device 14 is to place a marker on the electronic device 14 that the system 10 is able to detect.

In one embodiment, the electronic device 14 runs an application that allows it to be used as a virtual pre-viewer of a scene 19. This application may be configured to communicate with the system 10 to send information to help determine the position of the electronic device 14. For example, the electronic device 14 may have GPS, compass and/or accelerometer data that can be sent to the system 10. The accelerometer data might be used to determine what angle the electronic device 14 is tilted at relative to the floor. This may be used to determine the angle at which the virtual viewfinder is pointing. The GPS data may be used to determine the location of the electronic device 14 in the room.

In step 1004, a version of the scene 19 is determined from the perspective of the electronic device 14. Note that this may be performed in real-time in order to allow the scene to be viewed by the director in real time. The scene 19 that was created in process 500 may be from the perspective of the depth camera system 20. In some embodiments, the system 10 stores metadata such as 3D model of the room and a model of the actor 18. The 3D model of the room may include information such as the 3D coordinate of objects to be used as virtual props. The model of the actor 18 may include time based skeletal data. From this information, the system 10 is able to determine how the scene 19 would appear from the perspective of the electronic device 14.

In step 1006, the version of the scene 19 is transmitted to the electronic device 14. Typically, this will be by wireless transmission, but wireline transmission may be used. The transmission may use various mechanisms such as 802.11, Bluetooth, cellular telephone transmission, etc.

In step 1008, the version of the scene 19 is displayed on the electronic device 14. The aforementioned application on the electronic device 14 may be used to communicate with the system 10 to receive the version of the scene 19 and to present the scene 19 on a display. As noted above, the version of the scene 19 may be a real-time version. As the term "real-time" is presently being used, there may be some small delay due to the time it takes the system 10 to generate the version of the scene 19, transmission delay, rendering delays, and other possible delays.

In some embodiments, step 1008 includes rendering a re-targeted actor. For example, the director 11 can see the actor 18 re-targeted as Godzilla when looking at the display on the electronic device 14. More particularly, the director 11 may see Godzilla moving in real-time, based on the actor's motions.

Since the director 11 may change the position of the electronic device 14, the process 1000 may return to step 1002 to again determine the position of the electronic device 14. Other steps may then be performed to determine, transmit, and display the scene 19 from the perspective of the electronic device 14. The process 1000 may end in response to the user entering a command to instruct the system 10 that recording should end.

Figure 11:
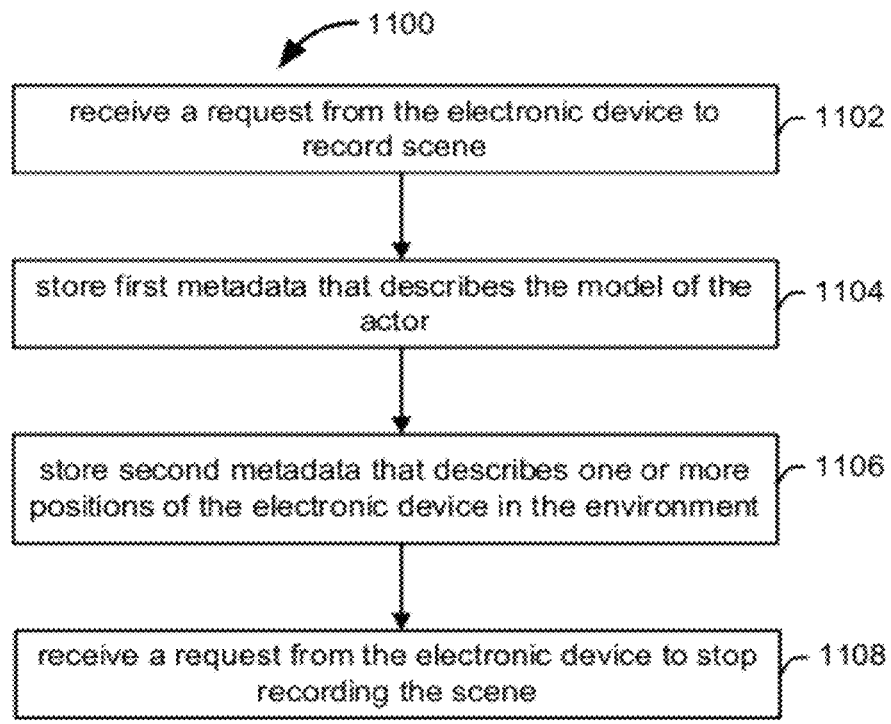
FIG. 11 is a flowchart of one embodiment of a process of capturing a scene from a movie being shot.

FIG. 11 is a flowchart of one embodiment of a process 1100 of capturing a scene for a movie being filmed. Process 1100 is one embodiment of step 904 of process 900. Process 1100 may be performed in response to a request to record a scene 19. Thus, process 1100 may start in response to a request to record and end in response to a request to stop recording. In step 1102, a request is received from the electronic device 14 to record metadata for a scene 19. For example, the electronic device 14 may be running an application that allows it to communicate with the system 10 in response to commands from the director 11.

In step 1104, the system 10 stores metadata that describes the model of the actor 18. As one example, skeletal data is stored. Additional metadata may continue to be stored until the user requests that recording stop. The metadata could also include data that describes positions of objects to be used virtual props.

In step 1106, the system 10 stores metadata that describes a position(s) of the electronic device 14. As one example 3D coordinates of the electronic device 14 are stored. Additional metadata may continue to be stored until the user requests that recording stop. Thus, the system 10 may store a data pairs that each contains the 3D position and a time value. The metadata may also include data that describes the orientation of the electronic device 14 (e.g., compass data, accelerometer data, etc.).

In step 1108, the system 10 receives a request to stop recording the scene. As noted above, the request may come from the electronic device 14.

Figure 12:
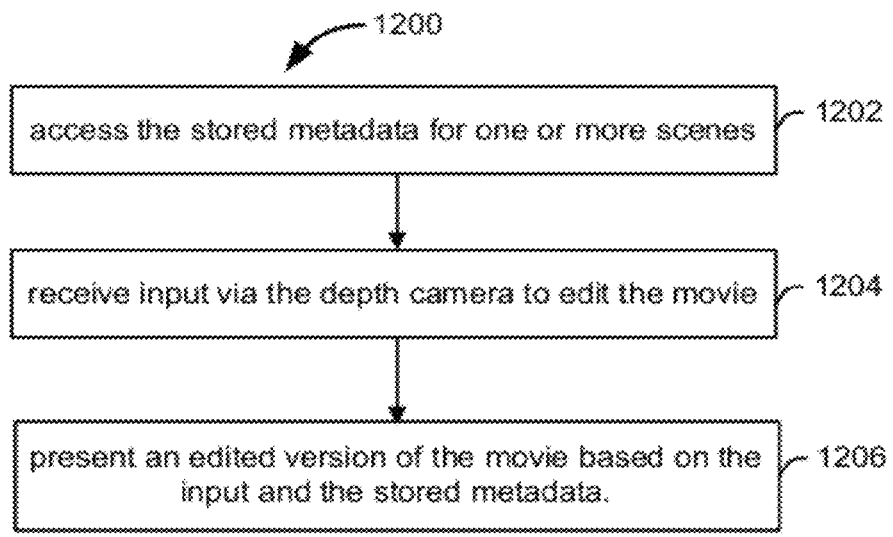
FIG. 12 is a flowchart of one embodiment of a process of editing a movie.

FIG. 12 is a flowchart of one embodiment of a process 1200 of editing a movie. Process 1200 is one embodiment of step 906 of process 900. Process 1200 allows a user to edit the movie using natural user input, such as gestures and voice commands. Process 1200 may begin in response to a user request to enter an editing mode. Numerous techniques may be used to enter the editing mode. In one embodiment, the user makes one or more gestures, which are interpreted by the system 12 as a request to enter the editing mode.

In step 1202, stored metadata for one or more scenes for the movie is accessed. For example, metadata that was stored when performing process 900 one or more times is accessed. Note that many different sets of metadata may be accessed such that many different scenes may be edited. The system 10 might present a snapshot of at least some of the scenes to allow the user to select a scene for editing.

In step 1204, the depth camera system 20 receives input which is interpreted by the system 12 as editing commands. Note that the depth camera system 20 may have one or more microphones that may allow the user to enter voice commands. For example, the user might point to one of the scenes and say "select scene" or "play scene." After viewing various scenes, the user might select certain scenes and order them for sequential presentation. The system 12 may allow the user to make modification to scenes as well. For example, upon viewing a scene, the user may decide that an actor 18 who was re-targeted as a lion should instead be retargeted as a tiger. To re-target, the user may say "re-target as tiger". In response, the system 12 might play the scene with the actor being re-targeted as a tiger. To do so, the system 12 may access the skeletal model of the actor 18, re-map it to a tiger skeleton, and overlay tiger features. The user might also change the perspective of scene. For example, the user may say "zoom in" or "zoom out" to cause the system 12 to create a version of the scene having a different zoom level. The user might also overlay music into a scene. These are just of few of the possible editing possibilities; many other editing possibilities exist.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method comprising: collecting depth information of a real world environment using a depth camera at a first real world position;
   generating a skeletal model of an actor in the real world environment using the depth information;
   tracking the skeletal model using the depth information;
   generating a first version of a scene based on the tracking of the skeletal model of the actor, the first version of the scene is as the scene would appear from the first real world position, wherein the generating the first version of the scene includes re-mapping the tracked skeletal model to a non-human skeletal model that tracks behavior of the actor;
   receiving a request to use a real object in the real world environment to serve as a virtual prop;
   determining a position of the real object in a 3D model of the real world environment based on the depth information;
   incorporating the virtual prop into the first version of the scene based on the position of the real object in the 3D model;
   and creating a movie based on the first version of the scene in response to user commands, including: determining a real world position at which an electronic device is located in the real world environment, the electronic device is located at a second real world position that is different than the first real world position of the depth camera;
   generating a second version of the scene as the scene would appear from the second real world position of the electronic device, the second version of the scene includes an image based on the non-human skeletal model that tracks behavior of the actor, wherein the generating the second version of the scene includes incorporating the virtual prop into the second version of the scene based on the position of the real object in the 3D model and the second real world position of the electronic device;
   and transmitting the second version of the scene in real-time to the electronic device.

2. The method of claim 1, wherein the creating a movie based on the first version of the scene in response to user commands includes:
   receiving a request from the electronic device to record metadata for the second version of the scene;
   storing first metadata that describes the tracking of the skeletal model of the actor for a period of time associated with the first version of the scene;
   storing second metadata that describes the second real world position of the electronic device in the environment for the period of time.

3. The method of claim 1, wherein the generating the first and second version of the scene further includes:
   generating a virtual scene; and
   placing the actor in the virtual scene.

4. The method of claim 1, wherein the creating a movie based on the first version of the scene in response to user commands includes:
   receiving input via the depth camera to edit the movie;
   accessing stored metadata that describes a plurality of scenes that were generated in accordance with the method of claim 1; and
   receiving input commands via the depth camera to edit the movie based on the stored metadata.

5. The method of claim 1, wherein the determining a real world position at which an electronic device is located in the real world environment comprises determining a 3D location of the electronic device based on the depth information collected by the depth camera.

6. The method of claim 1, wherein the determining a real world position at which an electronic device is located in the real world environment comprises tracking a 3D position of a user' hand based on the depth information collected by the depth camera.

7. A system for creating movies, the system including:
   a depth camera;
   one or more processors coupled to the depth camera;
   and computer storage media coupled to the one or more processors, the computer storage media having instructions stored thereon which, when executed on the one or more processors, cause the one or more processors to:
   collect depth information of a real world environment using the depth camera at a first real world position;
   generate and track a skeletal model based on the depth information, the skeletal model captures motion of an actor in the real world environment using the depth camera;
   generate a first version of a scene based on the skeletal model, the first version of the scene is as the scene would appear from the first real world position, wherein to generate the first version of the scene the one or more processors re-map the tracked skeletal model to a non-human skeletal model that tracks behavior of the actor;
   receive a request to use a real object in the real world environment to serve as a virtual prop;
   determine a position of the real object in a 3D model of the real world environment based on the depth information;
   incorporate the virtual prop into the first version of the scene based on the position of the real object in the 3D model;
   determine a real world position of an electronic device to be used as a virtual viewfinder, the real world position is for a time period associated with the scene, the electronic device is located at a second real world position that is different than the first real world position;
   generate a second version of the scene from the vantage point of the electronic device at the second real world position, the second version of the scene includes an image based on the non-human skeletal model that tracks behavior of the actor, wherein the processor incorporates the virtual prop into the second version of the scene based on the position of the real object in the 3D model and the second real world position of the electronic device;
   and provide the second version of the scene to the electronic device.

8. The system of claim 7, wherein the instructions further cause the one or more processors to:
   receive a request from the electronic device to record metadata for the second version of the scene;
   store first metadata that describes the captured motion of the actor, including the tracked skeletal model; and
   store second metadata that describes the second real world position of the electronic device.

9. The system of claim 7, wherein the instructions further cause the one or more processors to capture motion of the actor over a plurality of non-overlapping time periods, the instructions that cause the one or more processors to generate a first version of the scene cause the one or more processors to merge the captured motion of the actor into a scene such that the actor's motions from the plurality of non-overlapping time periods overlap in time in the first version of the scene.

10. The system of claim 7, wherein the instructions further cause the one or more processors to:
   receive input via the depth camera to edit a movie;
   access stored metadata that describes a plurality of scenes generated based at least on part on captured motion of actors using the depth camera; and
   receive input commands via the depth camera to edit the movie based on the stored metadata.

11. The system of claim 7, further comprising an RGB camera that captures RGB video of the real world environment, wherein the instructions that cause the one or more processors to generate the first version of the scene cause the one or more processors to generate the scene based on the RGB video and the captured motion of the actor.

12. A computer storage device comprising instructions that, when executed on a processor, cause the processor to:
   collect depth information of a real world environment using a depth camera at a first real world position;
   generate a model of the real world environment based on the depth information;
   generate a virtual movie set based on the model of the real world environment;
   develop a skeletal model for an actor in the real world environment using the depth information;
   track the skeletal model for a period of time;
   generate a first version of a scene based on the virtual movie set and the tracking of the skeletal model for the period of time, including instructions that cause the processor to re-map the tracked skeletal model to a non-human skeletal model that tracks behavior of the actor, the first version of the scene is as the scene would appear from the first real world position;
   receive a request to use a real object in the real world environment to serve as a virtual prop;
   determine a position of the real object in a 3D model of the real world environment based on the depth information;
   incorporate the virtual prop into the first version of the scene based on the position of the real object in the 3D model;
   determine one or more real world positions of an electronic device in the real world environment to be used as a virtual viewfinder, the one or more real world positions for the period of time and are different positions from the first real world position;
   generate a second version of the scene as it would appear from the one or more real world positions of the electronic device, the second version of the scene includes an image based on the non-human skeletal model that tracks behavior of the actor, the instructions cause the processor to incorporate the virtual prop into the second version of the scene based on the position of the real object in the 3D model and the second real world position of the electronic device;
   provide the second version of the scene in real-time to the electronic device;
   receive a request from the electronic device to record the second version of the scene;
   and store metadata that describes the tracking of the skeletal model and the one or more real world positions for the electronic device for the period of time.

13. The computer storage device of claim 12, wherein the instructions that cause the processor to determine one or more real world positions of an electronic device in the environment to be used as a virtual viewfinder include instructions that cause the processor to:
   determine one or more real world positions of the electronic device based on the depth information; and
   receive orientation data from the electronic device, the one or more real world positions are based on the orientation data.

14. The computer storage device of claim 12, further comprising instructions that cause the processor to:
   receive input via the depth camera to edit a movie;
   access stored metadata that describes a plurality of scenes that are generated based on virtual movie set sand tracking of skeletal models; and
   receive input commands via the depth camera to edit the movie based on the stored metadata.

15. The computer storage device of claim 12, further comprising instructions that cause the processor to:
   receive additional depth information from over a network, the generating a first version of the scene is further based on the additional depth information.

* * * * *